(12) United States Patent
Jinnai

(10) Patent No.: US 6,699,010 B2
(45) Date of Patent: Mar. 2, 2004

(54) NOZZLE ADJUSTMENT MECHANISM FOR VARIABLE-CAPACITY TURBINE

(75) Inventor: Yasuaki Jinnai, Kanagawa-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/853,679

(22) Filed: May 14, 2001

(65) Prior Publication Data

US 2002/0168262 A1 Nov. 14, 2002

(30) Foreign Application Priority Data

May 19, 2001 (JP) ........................................ 2000-148942

(51) Int. Cl.⁷ .............................................. F04D 17/16
(52) U.S. Cl. ..................... 415/164; 415/150; 60/602; 29/889.22
(58) Field of Search ..................... 415/150, 159–166, 415/148; 60/602; 29/889.22; 403/383, 359.1, 274, 282, 261; 411/402, 410, 407, 406, 271, 325, 919, 504, 506

(56) References Cited

U.S. PATENT DOCUMENTS

| | | | | |
|---|---|---|---|---|
| 3,209,446 A | * | 10/1965 | Nicholas | 403/282 |
| 4,150,915 A | * | 4/1979 | Karstensen | 415/160 |
| 4,307,994 A | * | 12/1981 | Brewer | 415/160 |
| 4,575,277 A | * | 3/1986 | Dickey | 403/383 |
| 4,585,390 A | * | 4/1986 | Pirtle et al. | 415/160 |
| 4,732,536 A | * | 3/1988 | Lejars et al. | 415/160 |
| 4,773,821 A | * | 9/1988 | Gonthier et al. | 415/160 |
| 4,979,874 A | * | 12/1990 | Myers | 415/160 |
| 5,156,439 A | * | 10/1992 | Idlani et al. | 403/282 |
| 5,492,446 A | * | 2/1996 | Hawkins et al. | 415/160 |
| 5,517,817 A | * | 5/1996 | Hines | 415/160 |
| 5,690,459 A | * | 11/1997 | Donovan et al. | 403/274 |
| 5,771,647 A | * | 6/1998 | Kempen et al. | 403/282 |
| 6,019,574 A | * | 2/2000 | DiBella | 415/160 |
| 6,050,775 A | * | 4/2000 | Erdmann et al. | 415/164 |
| 6,283,705 B1 | * | 9/2001 | Rice et al. | 415/160 |

FOREIGN PATENT DOCUMENTS

JP 60-198306 A * 10/1985 ................. 415/164

* cited by examiner

*Primary Examiner*—Christopher Verdier
(74) *Attorney, Agent, or Firm*—Wenderoth, Lind & Ponack, L.L.P.

(57) ABSTRACT

A nozzle adjustment mechanism for a variable-capacity turbine has a connection between a connecting lever, for connecting a nozzle drive component driven by a actuator to a nozzle vane, and an edge of a nozzle shaft on the nozzle vane. The connection has a high degree of strength and does not experience deformation. A connecting hole of the connecting lever has a stopper surface which is flat or curved. The connecting edge of the nozzle shaft also has a stopper surface which corresponds to the stopper surface of the connecting hole. When the connecting edge of the nozzle shaft goes into the connecting hole of the connecting lever, the stopper surface of the connecting edge is brought into contact with the stopper surface of the connecting hole. After contact is made, a fixing process is applied to the connecting edge. The connector lever and the connecting edge of the nozzle shaft are thus effectively locked together in such a way that neither can rotate with respect to the other. The end of the nozzle shaft, in other words, prevents the shaft's rotation.

6 Claims, 8 Drawing Sheets

NOZZLE ADJUSTMENT MECHANISM FOR VARIABLE-CAPACITY TURBINE

BACKGROUND OF THE INVENTION

1. Field of the Invention

This invention concerns a nozzle adjustment mechanism for a radial-flow variable-capacity turbine which may be used as a supercharger (an exhaust turbocharger) for an internal combustion engine. This type of radial-flow variable-capacity turbine is so constructed that the operating gases pass through a number of variably angled nozzle vanes from a coil-shaped scroll in the turbine casing, and the gases are made to flow to the turbine rotor so that they drive the rotation of the rotor.

2. Description of the Related Art

In recent years, if an internal combustion engine has a supercharger, it has become more and more common for it to be the kind of supercharger with a variable-capacity turbine. Such a turbine varies the flow rate of the exhaust gases transported from a coil-shaped scroll to the turbine rotor according to the operating state of the engine, and it does this variation in such a way as to match the flow rate of the engine exhaust gases to that rate which would produce the optimal operating condition of the supercharger.

The basic structure of a conventional supercharger is shown in FIG. 7 and FIG. 8. FIG. 7 is a perspective drawing of a supercharger with a variable-capacity turbine belonging to the prior art, and FIG. 8 shows an example of how link plate 3, nozzle vanes 2, and lever 1 are connected in the previous art. In FIG. 7, 10 is the turbine casing and 11 is the coil-shaped scroll in the outer periphery of the turbine casing 10. Number 12 is the turbine rotor, which is supported on the center of the casing by bearings (not pictured) such that it is free to rotate. The rotor is coaxial with the compressor (also not pictured).

Number 2 is a nozzle vane, a number of which are arranged in spaces along the circumference of the turbine on the inner periphery of the scroll 11. Nozzle shafts 02, on the inner extremity of the nozzle vanes 2, are supported in nozzle mounts 4, which are fixed to the turbine casing 10, such that they are free to rotate so that the angle of the nozzle vanes varies. 14 is the gas exhaust casing which guides the exhaust gases out of the engine once the gases have completed the work of expanding to drive the turbine rotor 12. The gas exhaust casing is fixed to the turbine casing 10.

Number 3 is a disk-shaped link plate. It is supported by the turbine casing 10 in such a way that it is free to rotate. Indentations 3a are provided along the periphery in which levers 1, which will be discussed shortly, can engage. Number 07 is an actuator which drives nozzle vanes 2 through the link plate 3. Number 005 is a lever which connects an actuator rod 7 of the actuator 07 to the link plate 3.

FIG. 8 shows how the link plate 3, levers 1, and nozzle vanes 2 are assembled. The indentations (oblong holes) 3a are provided on the inner periphery of the disk-shaped link plate 3, at regular intervals along the circumference of the turbine. Bosses 6, formed on the outer extremities of levers 1, engage in the indentations (oblong holes) 3a in such a way that they can rotate and scrape the surface of the indentation. The nozzle shaft 02 of each nozzle vane 2 is fixed to the inner extremity of one of the levers 1.

In this sort of variable-capacity turbine, the reciprocating displacement of the actuator 07 is transmitted to the link plate 3 by way of actuator rod 7 and lever 005 of the crank mechanism, thus driving the rotation of the link plate 3. When the link plate 3 rotates, the bosses 6 of the levers 1, which are engaged in indentations 3a of the link plate 3, move along the circumference of the link plate. Nozzle shafts 02, which are fixed to the interior extremities of the levers 1, thus rotate. This causes nozzle vanes 2 to rotate, changing the angle of their vanes.

In the variable-capacity turbine pictured in FIGS. 7 and 8, bosses 6 on the outer extremities of levers 1 engage in indentations 3a, which are provided on the inside of disk-shaped link plate 3 at regular intervals along the circumference of the turbine. The nozzle shafts 02 of nozzle vanes 2 are fixed to the interior extremities of the levers 1. Most variable-capacity turbines described above are used as exhaust gas turbines in the superchargers of automotive internal combustion engines. Such superchargers are small, so nozzle shaft 02 and the connecting hole of the nozzle vane 2 must have a small diameter, and with respect to strength, they will never be able to sustain much force. In general, therefore, the connection between nozzle vane 2 and lever 1 is made by pressing in order to secure the strength. In the prior art design shown in FIGS. 7 and 8, the edge of nozzle shaft 02 is pushed into the connecting hole in lever plate 1, and the connecting hole grips the edge of nozzle shaft 02. The end of the nozzle shaft is then riveted or welded so that nozzle vane 2 and lever 1 cannot rotate with respect to each other, but will remain fixed. Thus nozzle vane 2 and lever 1 are joined to each other.

In other words, in the technique employed in the prior art, when the connecting hole is made to grip the edge of nozzle shaft 02, both the connecting hole and the edge are forced to undergo deformation. Thus in order to fasten together nozzle shaft 02 of nozzle vane 2 and lever 1, a great deal of force is needed to push the shaft into the connecting hole. When this prior-art technique is used, then, as has been discussed, a small-diameter shaft 02 is forced into a small-diameter connecting hole with great force to join the two together. As a result, there is a chance that the nozzle shaft 02 might break or that some of connecting holes might break off when a large rotary force is applied to the area where the edge of the nozzle shaft 02 and connecting hole are connected, or that the portion where these two members are connected could be damaged.

Furthermore, since nozzle vane 2, being exposed to the exhaust gases, attains quite a high temperature, the portion where the edge of the nozzle shaft 02 goes into connecting hole, where the nozzle vane 2 and lever 1 are joined, also attains a high temperature. As was explained earlier, the connection is achieved by deformation, so its strength at high temperatures will be diminished. This will make the nozzle shaft 02 of nozzle vane 2 more prone to the type of damage mentioned above.

The vane angle of the variable-capacity turbine must necessarily be controlled closely. In the prior art described above, the relative angle of the nozzle vane 2 with respect to lever 1 is set during assembly with the help of a jig. This required a large number of assembly processes as well as special assembly tools such as the jig, driving up the production cost.

SUMMARY OF THE INVENTION

In view of these problems in the prior art, the objective of this invention is to provide a nozzle adjustment mechanism for a variable-capacity turbine which would have the following features. The connecting lever to connect the nozzle drive component driven by the actuator to the nozzle vane, and the edge of the nozzle shaft on the nozzle vane, would have a high degree of strength and would not experience deformation. There would be no need for special assembly tools such as a jig, and a highly accurate connection would be achieved with fewer assembly processes and at a lower cost.

The first preferred embodiment of this invention comprises a variable-capacity turbine which has a coil-shaped scroll in the turbine casing. A number of nozzle vanes are arranged along the circumference of the turbine at the inner peripheral side of the scroll and are supported on the turbine casing in such a way that they can rotate to vary the angle of the vanes. A turbine rotor rotates freely on the inner periphery of the nozzle vanes. Operating gases are made to flow from the scroll through the nozzle vanes to the turbine rotor, driving the rotation of the rotor. The turbine has a nozzle adjustment mechanism having a nozzle drive member for the nozzles which is connected to an actuator that causes the nozzle drive member to rotate around the turbine shaft, and a plurality of connecting levers to link the nozzle drive member to the nozzle vanes.

This variable-capacity turbine is distinguished by the following. The connecting hole of the connecting lever has a stopper surface which is flat or curved. The connecting edge of the nozzle shaft also has a stopper surface which corresponds to the stopper surface of the connecting hole. When the connecting edge of the nozzle shaft goes into the connecting hole of the connecting lever, the stopper surface of the connecting edge is brought into contact with the stopper surface of the connecting hole, contacting these non-circular surfaces with each other. This contact can be made without causing any deformation of either surface. After the contact is made, then the fixing process will be applied to the connecting edge. The connector lever and the connecting edge of the nozzle shaft are thus effectively locked together in such a way that neither can rotate with respect to the other. The end of the nozzle shaft, in other words, prevents the shaft's relative rotation.

As an actual configuration of the connection between the nozzle vane and connecting lever, the stopper surfaces of the connecting hole and the connecting edge can be shaped into two flat surfaces or preferably two parallel flat surfaces which oppose each other. The two flat surfaces on either side of the connecting hole and the connecting edge thus make contact with each other.

Alternatively, according to a second preferred embodiment of this invention, the non-circular shaped connection can be formed by cutting away a portion of a circular connection edge to form a single flat surface and providing a corresponding single flat surface in the circular connecting hole so that these two surfaces can come in contact with each other.

Further alternatively, according to a third preferred embodiment of this invention, the connection can be formed by serrating the connecting edge of the nozzle shaft and providing corresponding negative serrations on the surface of the connecting hole which can engage with the serrations on the nozzle shaft.

With these embodiments, when the connecting edge of nozzle vane engages in the connecting hole of lever, the stopper surfaces of the connecting hole and the stopper surfaces of the connecting edge are brought into contact with each other. The nozzle vane and the lever can thus be joined at a geometrically determined angle without experiencing any deformation. The connecting hole and the connecting edge can be engaged with a minimum of force in such a way that neither can rotate with respect to the other. The rotary force of the nozzle vane can be absorbed by contiguous stopper surfaces of the hole and the nozzle shaft.

With this design, the rotary force of the nozzle vane will not cause the connection area where the connecting hole and connecting edge are joined to fatigue. The nozzle shaft will not break, and the drive force from the link plate can be transmitted readily through the lever to the nozzle vane. Even if the connection area where the connecting hole and connecting edge are joined attains a high temperature, it will not experience deformation. Because the coupling is geometric, the rotational force will not damage the connection area where the nozzle shaft engages in the connecting hole. This design produces a coupling of the lever and nozzle vane which is extremely durable.

In this sort of variable-capacity turbine, the vane angle of nozzle vanes must be controlled very accurately. In these embodiments, when stopper surfaces on the connecting edge of the nozzle shaft come in contact with the connecting surfaces on the connecting hole of the lever, the nozzle vane and the lever are geometrically coupled in a previously determined relationship. It is thus no longer necessary, as in the prior art, to establish the relative angle of the two members with a jig when the nozzle vane and the lever are being assembled. Fewer assembly processes are required, and no special tools such as the jig are needed. This reduces the equipment cost.

In the second embodiment of the coupling of the nozzle vane and the lever plate, the stopper surfaces of connecting hole in the lever and the connecting edge of nozzle vane, which engages in the hole, are created by shaving off one side of the connecting edge to form flat the stopper surface and giving the connecting hole a flat surface with which the connecting edge will come in contact. In this second embodiment, only a single stopper surface on the shaft and lever prevents the relative rotation of the nozzle vane and the lever. Thus the degree of rotational force which can be absorbed by each stopper surface is less than if two surfaces are provided; however, fewer production processes are required.

In the third embodiment of the coupling of the nozzle vane and lever, the inner surface of the connecting hole comprises serrations, and the connecting edge of nozzle vane which engages in this connecting hole also has serrations along its inner surface. When serrations of the connecting hole engage with serrations of the connecting edge, they prevent relative rotation of the nozzle vane and lever. With this third embodiment, the ordinary sort of serrations can be machined, making the parts simple to produce. By changing the orientation at which the two serrated surfaces engage, the relative positions of nozzle vane and link plate are easily adjusted.

BRIEF DESCRIPTION OF THE DRAWINGS

FIG. 1 shows a first preferred embodiment of a connection for a nozzle vane and lever in the nozzle adjustment mechanism of a supercharger with a variable-capacity turbine according to this invention.

FIG. 2 shows a second preferred embodiment of the connection.

FIG. 3 shows a third preferred embodiment of the connection.

In these drawings, 1 is a lever, 2 is a nozzle vane, 02 is a nozzle shaft, 3 is a disk-shaped link plate, 03 are oblong holes, 4 is a nozzle mount, 05 is a riveted connection, 6 are bosses, 7 is an actuator rod, 10 is a turbine casing, 11 is a coil-shaped scroll, 12 is a radial-flow turbine rotor, 13 is a link chamber, 31 and 35 are connecting holes, 32 and 36 are stopper surfaces of a connecting hole, 33 and 37 are connecting edges, 34 and 38 are stopper surfaces of a connecting edge, 41 is a serration in a connecting hole, and 100 is a nozzle adjustment mechanism.

DETAILED DESCRIPTION OF THE PREFERRED EMBODIMENTS

In this section we shall explain several preferred embodiments of this invention with reference to the appended drawings. Whenever the shapes, relative positions and other aspects of the parts described in the embodiments are not clearly defined, the scope of the invention is not limited only to the parts shown, which are meant merely for the purpose of illustration.

Figure 5:
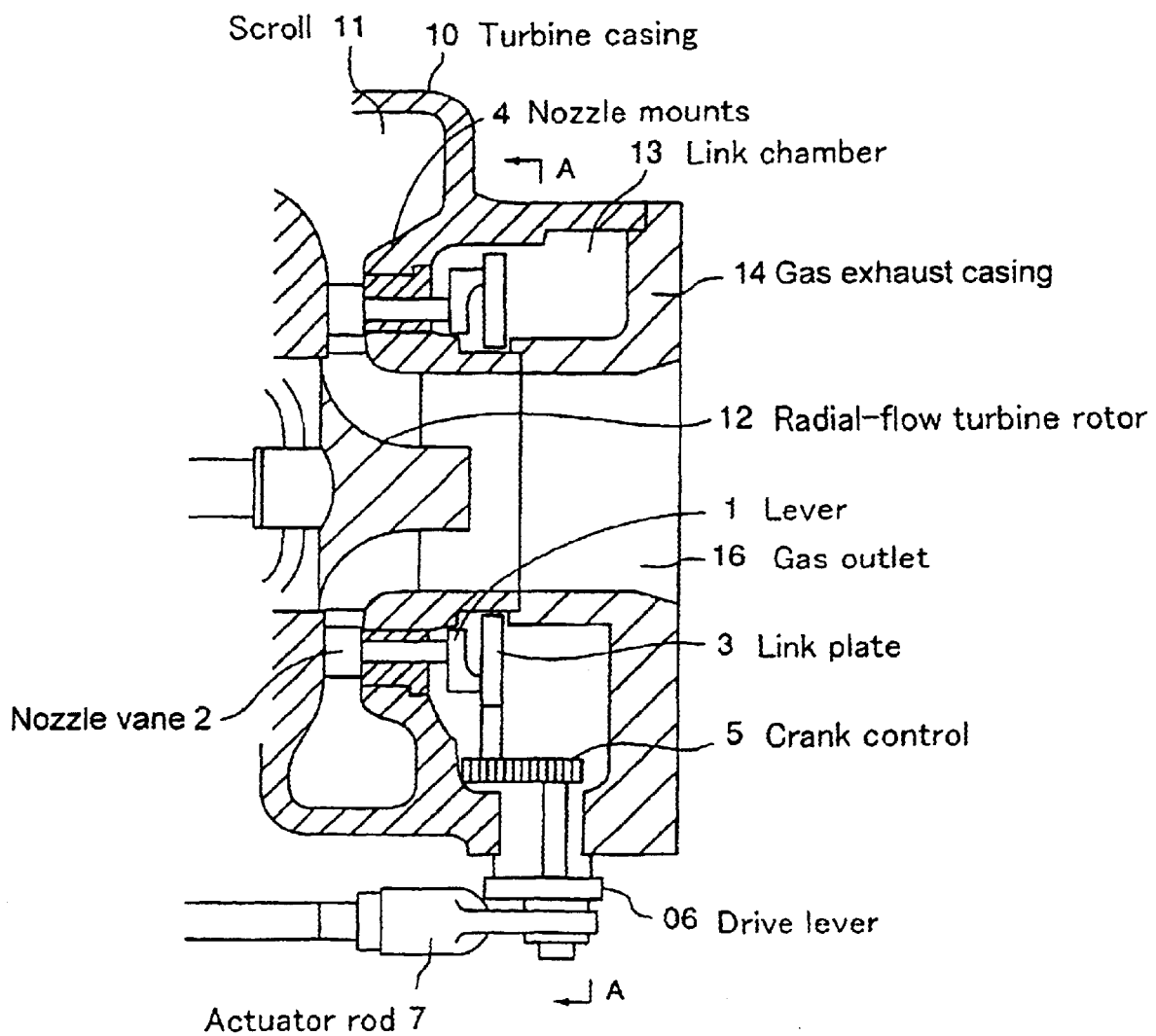
FIG. 5 is a cross section showing the essential parts along the nozzle shaft of the supercharger with a variable-capacity turbine.
Figure 6:
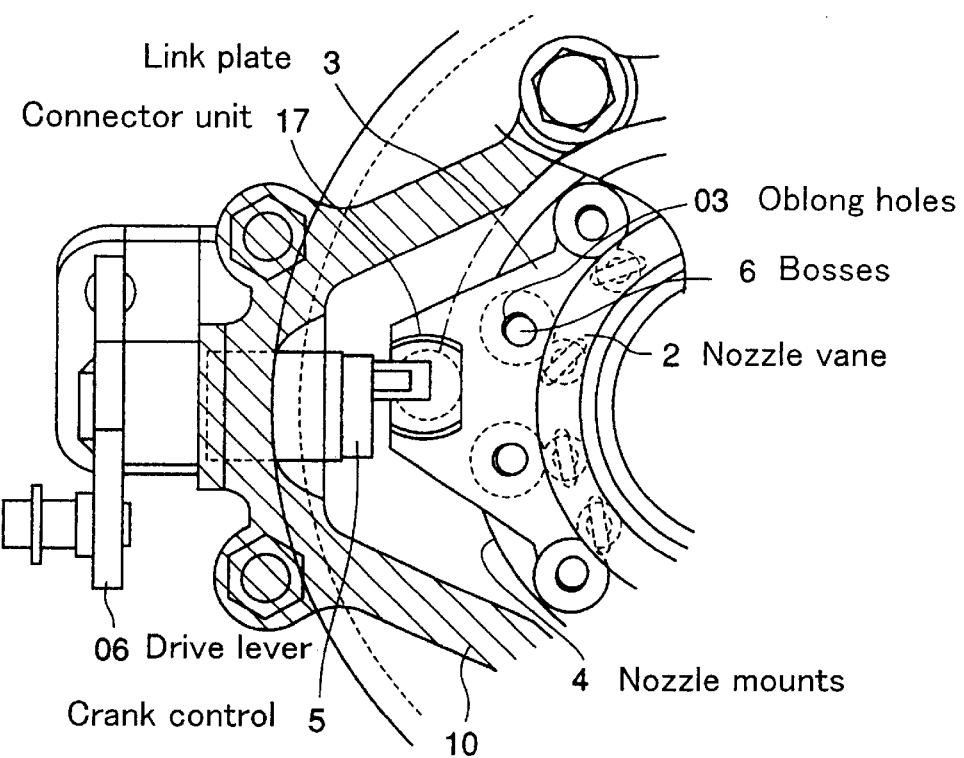
FIG. 6 is a cross section taken along line A—A in FIG. 5.
Figure 7:
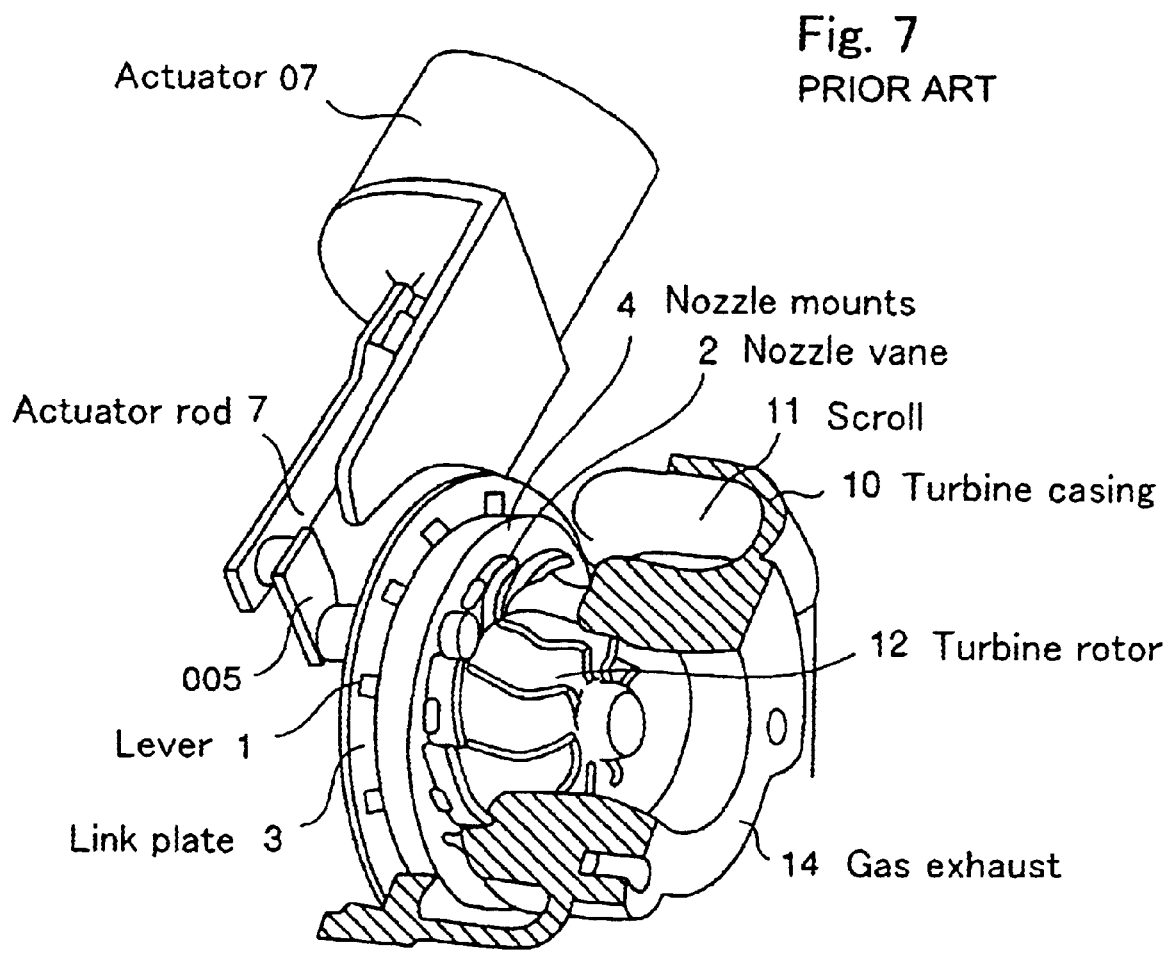
FIG. 7 shows an example of a supercharger with a variable-capacity turbine belonging to the prior art.
Figure 8:
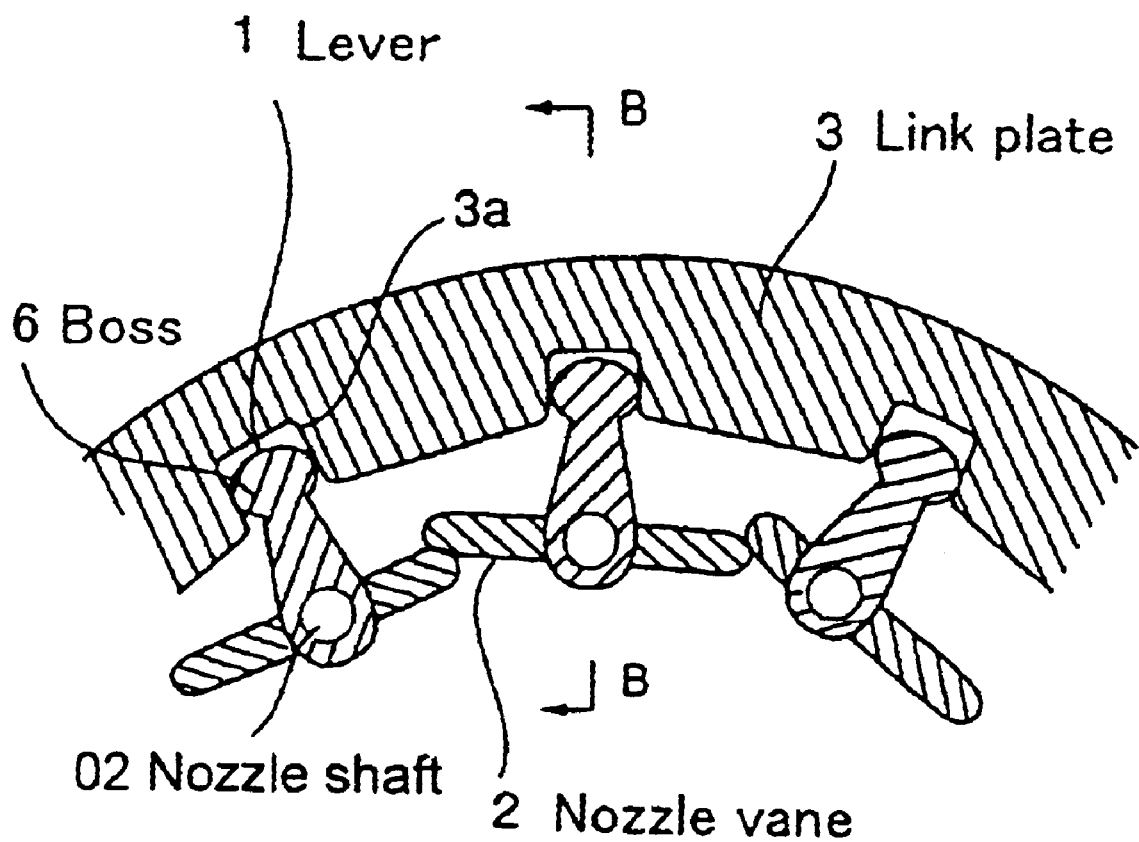
FIG. 8 is a partial frontal cross section (taken at a right angle with respect to the shaft of the turbine) of the supercharger of FIG. 7.

FIG. 5 is a cross section showing the essential parts along the nozzle shaft of the supercharger with a variable-capacity turbine, and FIG. 6 is a cross section taken along line A—A in FIG. 5.

In FIGS. 5 and 6, 10 is the turbine casing and 11 is the coil-shaped scroll on the outer periphery of the turbine casing 10. 12 is a radial-flow turbine rotor. This rotor is coaxial with the compressor, which is not pictured. It is supported in the center casing by bearings (neither of which is shown) in such a way that it is free to rotate.

Number 2 is a nozzle vane. A number of these vanes are provided along the inside of the scroll 11, at regular intervals along the circumference of the turbine. Nozzle shaft 02, which is on the vane end of the nozzle, is supported, in such a way that it is free to rotate, by nozzle mount 4, which is fixed to the turbine casing 10. The angle of the vane can be varied by a means which will be described shortly. Number 14 is a casing through which the gases can escape. It is a channel fixed to the turbine casing 10 to lead the exhaust gases, once they have been expanded and have acted on the turbine rotor 12, outside the turbine. Number 16 is the gas outlet for the gases.

Number 3 is the disk-shaped link plate, which is supported by the turbine casing 10 in such a way that it can rotate. Oblong holes 03, in which bosses 6 on lever 1 (which will be described shortly) engage, are provided at regular intervals along the circumference of the turbine. The center lines of the oblong holes 03 are at a fixed angle with respect to a radial line which passes through the shaft of the turbine. This reduces the transfer resistance of the drive force from link plate 3 to lever 1.

Number 7 is the actuator rod, which is the output end of actuator 07 (not shown in FIG. 5), the component which drives the nozzle vane 2. The reciprocating motion of the actuator rod 7 is converted to rotation by connector mechanism 17, which comprises drive lever 06, crank control 5 and a ball joint, and transmitted to the link plate 3.

In a supercharger with a variable-capacity turbine configured as described, the exhaust gas from an internal combustion engine (not pictured) enters the scroll 11, travels through the coil of the scroll 11, and flows into nozzle vane 2. The exhaust gas flows past the vane space of the nozzle vane 2. From the periphery, it flows into the turbine rotor 12, moving toward the center of the rotor. After the expanding gas has acted on the turbine rotor 12, the gas flows out in the axial direction, is guided into gas outlet 16 and is exhausted to the exterior.

To control the capacity in such a variable-capacity turbine, the angle of the vane of the nozzle vane 2 is set by a control means (not pictured) with respect to the actuator so that the flow rate of the exhaust gas moving through the nozzle vane 2 is the rate desired. The reciprocating displacement of actuator 07 which corresponds to a given vane angle is converted to rotation by connector unit 17, which consists of actuator rod 7, drive lever 06, crank control 5 and a ball joint, and transferred to the link plate 3, driving the rotation of the link plate.

As the link plate 3 rotates, the bosses 6 of the levers 1 which engage in oblong holes 03 of the link plate 3 proceed along the periphery, rotating and sliding along the inner surfaces of the oblong holes 03. As bosses 6 move, the nozzle shafts 02 are made to rotate via the arm-like levers 1, the bases of which are fixed to the nozzle shafts 02. Thus nozzle vanes 2 rotate, and the actuator 07 varies the vane angles.

Figure 4:
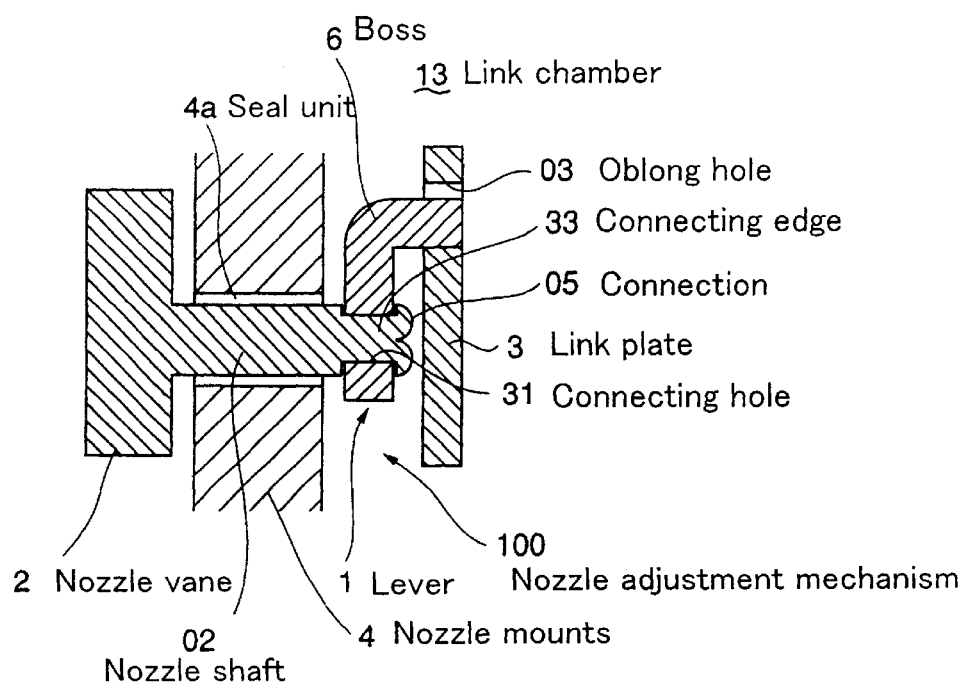
FIG. 4 is a cross section showing essential parts of a nozzle adjustment mechanism in a supercharger with a variable-capacity turbine applied to this invention.

In FIG. 4, which shows the nozzle adjustment mechanism mentioned above, 100 is the nozzle adjustment mechanism. It has the following configuration.

Number 3 is the disk-shaped link plate. As has been described above, it is connected to actuator rod 7 through connecting mechanism 17 so that it rotates on the turbine shaft. Oblong holes 03 are provided at regular (or irregular) intervals along the circumference of the turbine. Number 2 is the nozzle vane, a number of which are arranged at regular intervals along the circumference of the turbine on the inside of the scroll 11. Nozzle shaft 02, which is on the vane end of the nozzle, is supported by the nozzle mount 4, in such a way that it can rotate, through seal unit 4a, which forms a gas seal for the interior of the link chamber 13.

One end of each of the levers 1 is fixed via connection 05, using the method mentioned later, to the end of the nozzle shaft 02 opposite nozzle vane 2. Bosses 6, which are formed on the other end of the levers 1, engage in the oblong holes 03 of the link plate 3 in such a way that they can rotate and slide along the inner surface of the hole.

The lever 1 and link plate 3 are arranged as follows. Lever 1 is placed between the nozzle vane 2 and link plate 3 in link chamber 13, which is further inside the scroll 11. These parts are provided at the gas outlet side of the nozzle vanes.

Figure 1A:
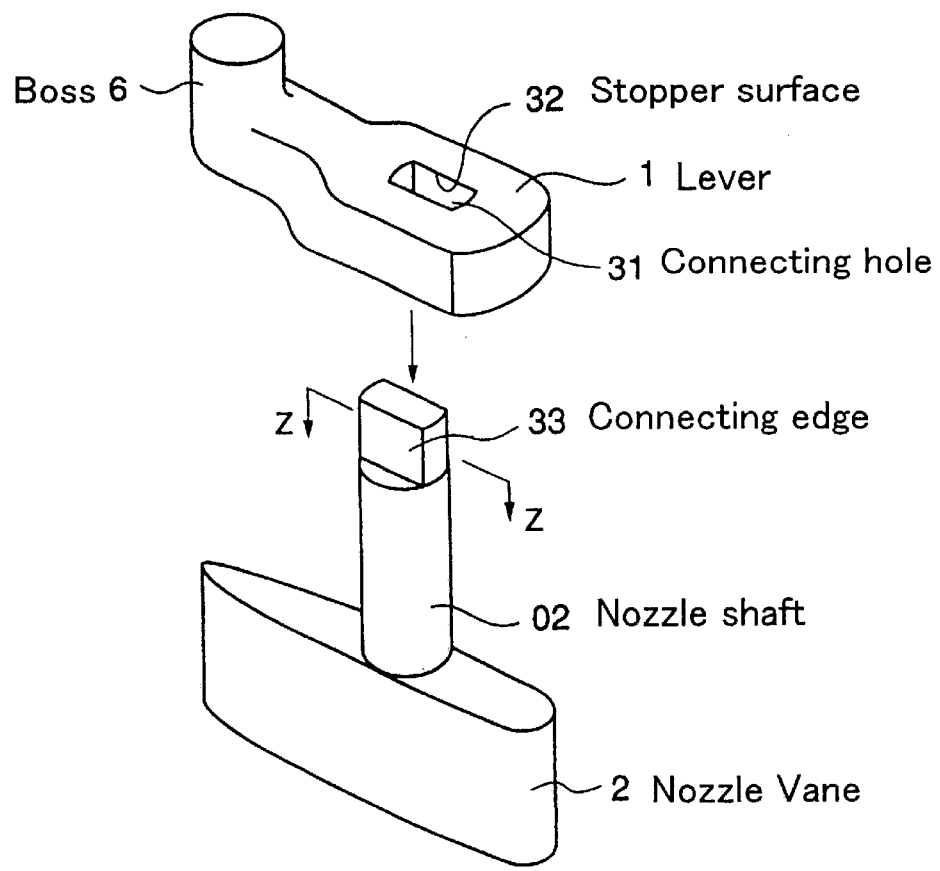
FIG. 1(A) is a perspective drawing of the connection.
Figure 1B:
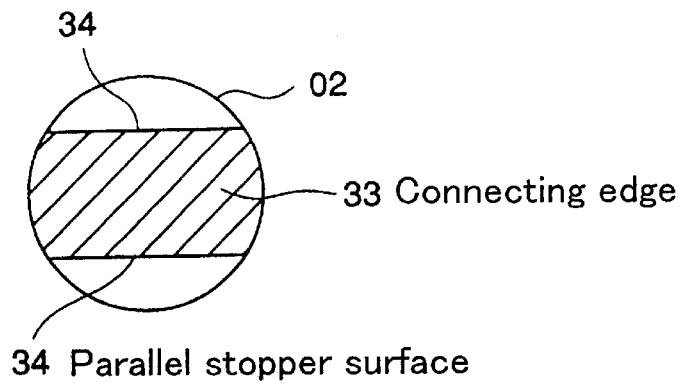
FIG. 1(B) is a cross section taken along line Z—Z in Figure 1(A).

In FIG. 1, which shows the details of the connection, 1 is the lever. On one end of the lever is boss 6, which engages in oblong hole 03 of the link plate 3. On the other end is connecting hole 31, which is oriented parallel to the axis of the boss 6. The connecting hole 31 is approximately a semicircle. Two stopper surfaces 32 of connecting hole 31 which act as a stop for the nozzle shaft, are parallel to each other on opposite sides of the plate.

Connecting edge 33, which engages in the connecting hole 31, is formed on the end of nozzle shaft 02 of the nozzle vane 2. The connecting edge 33 is narrow and is shaped exactly like the connecting hole 31 in which it engages. When its parallel stopper surfaces 34 come in contact with stopper surfaces 32 of the connecting hole, the lever 1 and nozzle vane 2 are locked together in such a way that neither can rotate with respect to the other. When the connecting edge 33 has engaged in connecting hole 31, as can be seen in FIG. 4, the end of the shaft is riveted (05 is the riveted portion) to insure that the shaft is immobilized. The end of the connecting edge could alternatively be immobilized with a small quantity of welding.

In this embodiment, when connecting edge 33 of nozzle vane 2 engages in connecting hole 31 of the lever 1, the stopper surfaces 32 of the connecting hole 31 and stopper surfaces 34 of connecting edge 33 are brought into contact at an angle which is determined geometrically so that the vane angle of nozzle vane 2 and the rotary angle of link plate 3 will have the proper relationship. The end of connecting edge 33 is then riveted (05 is the riveted portion) to insure that it is locked in place. The end of the shaft could alternatively be immobilized with a small quantity of welding.

With this embodiment, when connecting edge 33 of nozzle vane 2 engages in connecting hole 31 of lever 1, stopper surfaces 32 of the connecting hole 31 and stopper surfaces 34 of connecting edge 33 are brought into contact with each other. Nozzle vane 2 and lever 1 can thus be joined at a geometrically determined angle without experiencing any plastic deformation. The connecting hole 31 and connecting edge 33 can be engaged with a minimum of force in such a way that neither can rotate with respect to the other. The rotary force of nozzle vane 2 can be absorbed by contiguous stopper surfaces 32 of the connecting hole and 34 of the shaft. The end of connecting edge 33 and hole 31 can be fixed by riveting or welding if necessary.

With this design, the rotary force of nozzle vane 2 will not cause the area where the connecting hole 31 and connecting edge 33 are joined to fatigue. Nozzle shaft 02 will not break, and the drive force from link plate 3 can be transmitted readily through lever 1 to nozzle vane 2. Even if the area where the connecting hole 31 and connecting edge 33 are joined attains a high temperature, it will not experience deformation. Because the coupling is geometric, the rotational force will not damage the area where the shaft engages in the connecting hole. This design produces a coupling of lever 1 and nozzle vane 2 which is extremely durable.

In this sort of variable-capacity turbine, the vane angle of nozzle vanes 2 must be controlled very accurately. In these embodiments, when stopper surfaces 34 on connecting edge 33 of nozzle vane 2 come in contact with stopper surfaces 32 of connecting hole 31 in lever 1, nozzle vane 2 and lever 1 are geometrically coupled in a previously determined relationship. It is thus no longer necessary, as in the prior art, to establish the relative angle of the two components with a jig when the nozzle vane 2 and lever 1 are being assembled. Fewer assembly processes are required, and no special tools such as the jig are needed. This reduces the equipment cost.

The connecting hole 31 and connecting edge 33 may also have an elliptical or oval shape.

Figure 2A:
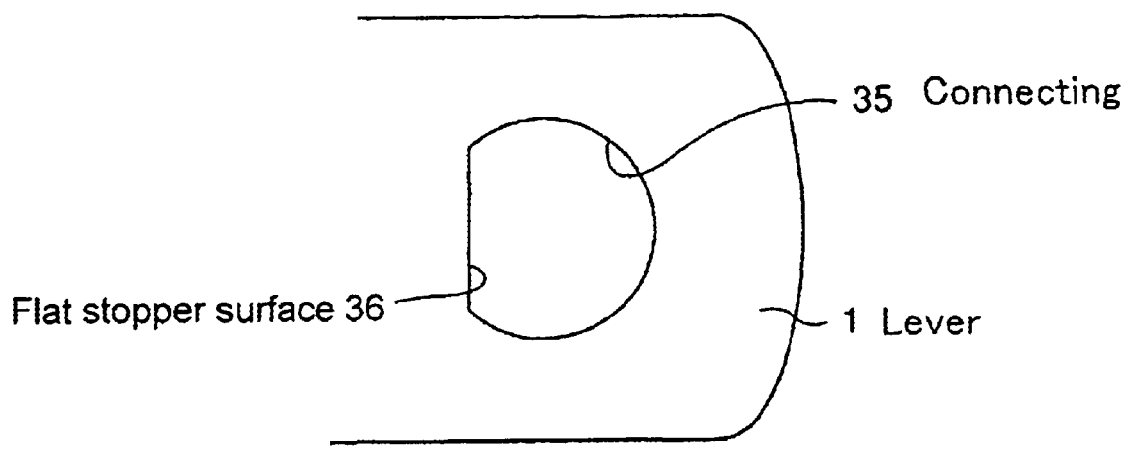
FIG. 2(A) is a plan view of the lever.
Figure 2B:
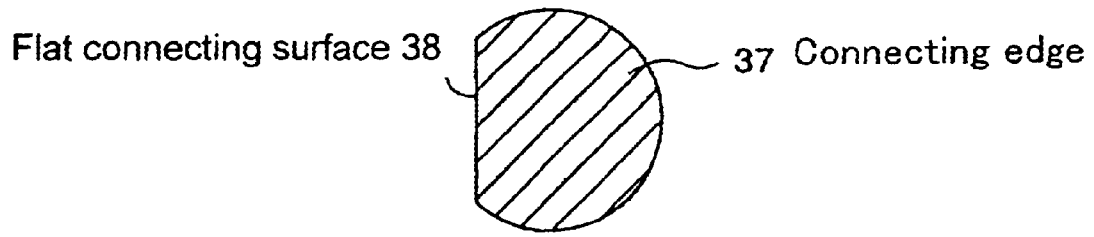
FIG. 2(B) is a cross section of the connecting edge of the lever (corresponding to FIG. 1(B) taken along line Z—Z).

In the second embodiment of the coupling of the nozzle vane and the lever, which is shown in FIG. 2, the shape of connecting hole 35 in the lever 1 and connecting edge 37 of nozzle vane 2, which engages in this connecting hole, are created by shaving off one side of the connecting edge 37 to form flat connecting surface 38 and giving the connecting hole 35 a flat stopper surface 36 with which the connector will come in contact. FIG. 2(A) is a plan view of lever 1, and FIG. 2(B) is a cross section of the connecting edge of the lever (corresponding to the FIG. 1(B) taken along line Z—Z).

In this embodiment, only single stopper surfaces, stopper surface 38 on the shaft and stopper surface 36 of the connecting hole, the stopper surface which comes in contact with surface 38, prevent the relative rotation of nozzle vane 2 and lever 1. Thus the degree of rotational force which can be absorbed by the stopper surface 38 and 36 is less than if two surfaces are provided; however, fewer production processes are required.

Figure 3A:
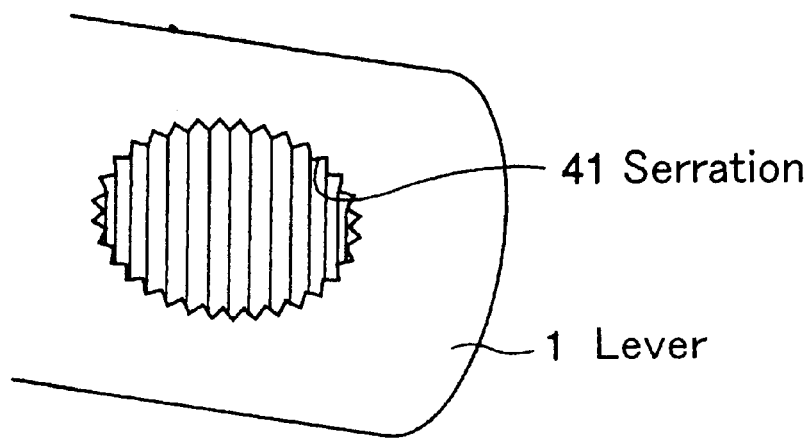
FIG. 3(A) is a plan view of the lever.
Figure 3B:
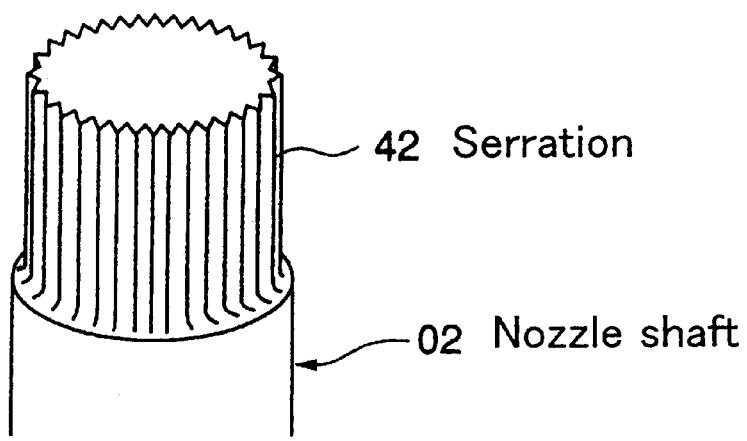
FIG. 3(B) is a perspective drawing of the end of the nozzle shaft.

In the third embodiment of the coupling of the nozzle vane and lever, which is shown in FIG. 3, the stopper surface of the connecting hole in the lever 1 has serrations 41, and the connecting edge of nozzle vane 2 which engages in this hole also has serrations 42 along its surface. FIG. 3(A) is a plan view of the lever; 3(B) is a perspective drawing of the end of the nozzle shaft. When serrations 41 of the connecting hole engage with serrations 42 of the connecting edge, they prevent the relative rotation of the nozzle vane 2 and lever 1. With this embodiment, the ordinary sort of serrations can be machined, making the parts simple to produce. By changing the orientation at which the two serrated stopper surfaces engage, the relative positions of nozzle vane 2 and link plate 3 can be easily adjusted.

With the invention mentioned above, the nozzle vane and the lever can thus be joined at a geometrically determined angle without experiencing any deformation. The connecting hole and the connecting edge can be engaged with a minimum of force in such a way that neither can rotate with respect to the other. The rotary force of the nozzle vane can be absorbed by contiguous stopper surfaces of the hole and the nozzle shaft.

With this design, the rotary force of the nozzle vane will not cause the connection area where the connecting hole and connecting edge are joined to fatigue. The nozzle shaft will not break, and the drive force from the link plate can be transmitted readily through the lever to the nozzle vane. Even if the connection area where the connecting hole and connecting edge are joined attains a high temperature, it will not experience deformation. Because the coupling is geometric, the rotational force will not damage the connection area where the nozzle shaft engages in the connecting hole. This design produces a coupling of the lever and nozzle vane which is extremely durable.

In this sort of variable-capacity turbine, when stopper surfaces on the connecting edge of the nozzle shaft come in contact with the connecting surfaces on the connecting hole of the lever, the nozzle vane and the lever are geometrically coupled in a previously determined relationship. It is thus no longer necessary, as in the prior art, to establish the relative angle of the two members with a jig when the nozzle vane and the lever are being assembled. Fewer assembly processes are required, and no special tools such as the jig are needed. This reduces the equipment cost.

In the second embodiment of the coupling of the nozzle vane and the lever plate as shown in FIG. 2, the stopper surfaces of connecting hole in the lever and the connecting edge of nozzle vane, which engages in the hole, are created by shaving off one side of the connecting edge to form the flat stopper surface and giving the connecting hole a flat surface with which the connecting edge will come in contact. Since only a single stopper surface on the shaft and lever prevents the relative rotation of the nozzle vane and the lever, the degree of rotational force which can be absorbed by each stopper surface is less than if two surfaces are provided; however, fewer production processes are required.

In the third embodiment of the coupling of the nozzle vane and lever as shown in FIG. 3, the ordinary sort of serrations can be machined, making the parts simple to produce. By changing the orientation at which the two serrated surfaces engage, the relative positions of nozzle vane and link plate can be easily adjusted.

What is claimed is:

1. A variable-capacity turbine comprising:
a coil-shaped scroll in a turbine casing;
a plurality of nozzle vanes circumferentially arranged along an inner peripheral side of said scroll, said vanes being rotatably supported by said turbine casing so as to be capable of varying an angle of said vanes, and each of said vanes having a respective nozzle shaft;
a turbine rotor disposed inside of said vanes and being rotatable when operating gases flow from said scroll through said vanes to said turbine rotor; and
a nozzle adjustment mechanism comprising:
a nozzle drive member connected to an actuator, said actuator being capable of rotating said drive member about a turbine axis, and
a plurality of connecting levers connecting said nozzle drive member to said vanes,
wherein each of said connecting levers has a respective connecting hole with a stopper surface that is at least partly non-circular in shape, each said nozzle shaft has a connecting edge having a stopper surface with an at least partly non-circular shape corresponding to said stopper surface of said connecting hole, said stopper surface of each said connecting edge contacting a stopper surface of a respective said connecting hole so as to be connected and locked together without deformation of said stopper surface of said connecting hole or said stopper surface of said connecting edge and such that said stopper surface of said connecting hole and said stopper surface of said connecting edge cannot rotate relative to each other,
wherein said connecting edge is fixed with respect to said connecting hole,
wherein said stopper surface of said connecting hole and said stopper surface of said connecting edge are each shaped to have two flat parallel surfaces, said two flat parallel surfaces of said stopper surface of said connecting hole contacting said two flat parallel surfaces of said stopper surface of said connecting edge, and wherein said connecting edge is fixed with respect to said connecting hole by a rivet or weld of only an end of said connecting edge such that a remaining portion of said connecting edge of said nozzle shaft other than said end remains intact without deformation of said stopper surface of said connecting hole or said stopper surface of said connecting edge.

2. A variable-capacity turbine comprising:
a coil-shaped scroll in a turbine casing;
a plurality of nozzle vanes circumferentially arranged along an inner peripheral side of said scroll, said vanes being rotatably supported by said turbine casing so as to be capable of varying an angle of said vanes, and each of said vanes having a respective nozzle shaft;
a turbine rotor disposed inside of said vanes and being rotatable when operating gases flow from said scroll through said vanes to said turbine rotor; and
a nozzle adjustment mechanism comprising:
a nozzle drive member connected to an actuator, said actuator being capable of rotating said drive member about a turbine axis, and
a plurality of connecting levers connecting said nozzle drive member to said vanes,
wherein each of said connecting levers has a respective connecting hole with a stopper surface that is at least partly non-circular in shape, each said nozzle shaft has a connecting edge having a stopper surface with an at least partly non-circular shape corresponding to said stopper surface of said connecting hole, said stopper surface of each said connecting edge contacting a stopper surface of a respective said connecting hole so as to be connected and locked together without deformation of said stopper surface of said connecting hole or said stopper surface of said connecting edge and such that said stopper surface of said connecting hole and said stopper surface of said connecting edge cannot rotate relative to each other, wherein said connecting edge is fixed with respect to said connecting hole, wherein said stopper surface of said connecting hole and said stopper surface of said connecting edge are each shaped as a single flat surface provided along a circle, said single flat surface of said connecting edge being formed by cutting away a portion of said circle of said connecting edge, said flat surface of said stopper surface of said connecting hole contacting said flat surface of said stopper surface of said connecting edge, and wherein said connecting edge is fixed with respect to said connecting hole by a rivet or weld of only an end of said connecting edge such that a remaining portion of said connecting edge of said nozzle shaft other than said end remains intact without deformation of said stopper surface of said connecting hole or said stopper surface of said connecting edge.

3. A variable-capacity turbine comprising:

a coil-shaped scroll in a turbine casing;

a plurality of nozzle vanes circumferentially arranged along an inner peripheral side of said scroll, said vanes being rotatable supported by said turbine casing so as to be capable of varying an angle of said vanes, and each of said vanes having a respective nozzle shaft;

a turbine rotor disposed inside of said vanes and being rotatable when operating gases flow from said scroll through said vanes to said turbine rotor; and a nozzle adjustment mechanism comprising:
  a nozzle drive member connected to an actuator, said actuator being capable of rotating said drive member about a turbine axis, and
  a plurality of connecting levers connecting said nozzle drive member to said vanes,
  wherein each of said connecting levers has a respective connecting hole with a stopper surface that is at least partly non-circular in shape, each said nozzle shaft has a connecting edge having a stopper surface with an at least partly non-circular shape corresponding to said stopper surface of said connecting hole, said stopper surface of each said connecting edge contacting a stopper surface of a respective said connecting hole so as to be connected and locked together without deformation of said stopper surface of said connecting hole or said stopper surface of said connecting edge and such that said stopper surface of said connecting hole and said stopper surface of said connecting edge cannot rotate relative to each other,
  wherein said connecting edge is fixed with respect to said connecting hole,
wherein said stopper surface of said connecting hole and said stopper surface of said connecting edge are each shaped as serrated surfaces, said serrated surface of said stopper surface of said connecting hole contacting said serrated surface of said stopper surface of said connecting edge, and wherein said connecting edge is fixed with respect to said connecting hole by a rivet or weld of only an end of said connecting edge such that a remaining portion of said connecting edge of said nozzle shaft other than said end remains intact without deformation of said stopper surface of said connecting hole or said stopper surface of said connecting edge.

4. A method of assembling a nozzle adjustment mechanism of a variable-capacity turbine, the variable capacity turbine comprising a coil-shaped scroll in a turbine casing, a plurality of nozzle vanes circumferentially arranged along an inner peripheral side of the scroll, the vanes being rotatable supported by the turbine casing so as to be capable of varying an angle of the vanes, and each of the vanes having a respective nozzle shaft, and a turbine rotor disposed inside of the vanes and being rotatable when operating gases flow from the scroll through the vanes to the turbine rotor and the nozzle adjustment mechanism, said method comprising:

connecting a nozzle drive member to an actuator, the actuator being capable of rotating the drive member about a turbine axis, and connecting a plurality of connecting levers to the nozzle drive member and to the vanes, wherein each of the connecting levers has a respective connecting hole with a stopper surface that is at least partly non-circular in shape, each nozzle shaft has a connecting edge having a stopper surface with an at least partly non-circular shape corresponding to said stopper surface of said connecting hole, said connecting comprising contacting the stopper surface of each connecting edge with a stopper surface of a respective connecting hole so as to be connected and locked together without deformation of the stopper surface of the connecting hole or the stopper surface of the connecting edge and such that said stopper surface of the connecting hole and the stopper surface of the connecting edge cannot rotate relative to each other and fixing the connecting edge with respect to said connecting hole, wherein:

the stopper surface of the connecting hole and the stopper surface of the connecting edge are each shaped to have two flat parallel surfaces;

the two flat parallel surfaces of the stopper surface of the connecting hole are contacted with the two flat parallel surfaces of the stopper surface of the connecting edge; and said fixing comprises riveting or welding only an end of the connecting edge such that a remaining portion of the connecting edge of the nozzle shaft other than the end remains intact without deformation of the stopper surface of the connecting hole or the stopper surface of the connecting edge.

5. A method of assembling a nozzle adjustment mechanism of a variable-capacity turbine, the variable capacity turbine comprising a coil-shaped scroll in a turbine casing, a plurality of nozzle vanes circumferentially arranged along an inner peripheral side of the scroll, the vanes being rotatably supported by the turbine casing so as to be capable of varying an angle of the vanes, and each of the vanes having a respective nozzle shaft, and a turbine rotor disposed inside of the vanes and being rotatable when operating gases flow from the scroll through the vanes to the turbine rotor and the nozzle adjustment mechanism, said method comprising:

connecting a nozzle drive member to an actuator, the actuator being capable of rotating the drive member about a turbine axis, and connecting a plurality of connecting levers to the nozzle drive member and to the vanes, wherein each of the connecting levers has a respective connecting hole with a stopper surface that is at least partly non-circular in shape, each nozzle shaft has a connecting edge having a stopper surface with an at least partly non-circular shape corresponding to said stopper surface of said connecting hole, said connecting comprising contacting the stopper surface of each connecting edge with a stopper surface of a respective connecting hole so as to be connected and locked together without deformation of the stopper surface of the connecting hole or the stopper surface of the connecting edge and such that said stopper surface of the connecting hole and the stopper surface of the connecting edge cannot rotate relative to each other and fixing the connecting edge with respect to said connecting hole, wherein:

- the stopper surface of the connecting hole and the stopper surface of the connecting edge are each shaped as a single flat surface provided along a circle;
- said single flat surface of said connecting edge is formed by cutting away a portion of said circle of said connecting edge;
- the flat surface of the stopper surface of the connecting hole is contacted with the flat surface of the stopper surface of said connecting edge; and
- said fixing comprises riveting or welding only an end of the connecting edge such that a remaining portion of the connecting edge of the nozzle shaft other than the end remains intact without deformation of the stopper surface of the connecting hole or the stopper surface of the connecting edge.

6. A method of assembling a nozzle adjustment mechanism of a variable-capacity turbine, the variable capacity turbine comprising a coil-shaped scroll in a turbine casing, a plurality of nozzle vanes circumferentially arranged along an inner peripheral side of the scroll, the vanes being rotatably supported by the turbine casing so as to be capable of varying an angle of the vanes, and each of the vanes having a respective nozzle shaft, and a turbine rotor disposed inside of the vanes and being rotatable when operating gases flow from the scroll through the vanes to the turbine rotor and the nozzle adjustment mechanism, said method comprising:

connecting a nozzle drive member to an actuator, the actuator being capable of rotating the drive member about a turbine axis, and connecting a plurality of connecting levers to the nozzle drive member and to the vanes, wherein each of the connecting levers has a respective connecting hole with a stopper surface that is at least partly non-circular in shape, each nozzle shaft has a connecting edge having a stopper surface with an at least partly non-circular shape corresponding to said stopper surface of said connecting hole, said connecting comprising contacting the stopper surface of each connecting edge with a stopper surface of a respective connecting hole so as to be connected and locked together without deformation of the stopper surface of the connecting hole or the stopper surface of the connecting edge and such that said stopper surface of the connecting hole and the stopper surface of the connecting edge cannot rotate relative to each other and fixing the connecting edge with respect to said connecting hole, wherein:

- the stopper surface of the connecting hole and the stopper surface of the connecting edge are each shaped as serrated surfaces;
- the serrated surface of the stopper surface of the connecting hole is contacted with the serrated surface of the stopper surface of the connecting edge; and
- said fixing comprises riveting or welding only an end of the connecting edge such that a remaining portion of the connecting edge of the nozzle shaft other than the end remains intact without deformation of the stopper surface of the connecting hole or the stopper surface of the connecting edge.

\* \* \* \* \*